(12) United States Patent
Ho et al.

(10) Patent No.: US 8,978,065 B1
(45) Date of Patent: *Mar. 10, 2015

(54) METHOD AND SYSTEM TO COMBINE BROADCAST TELEVISION AND INTERNET TELEVISION

(71) Applicant: TP Lab, Inc., Palo Alto, CA (US)

(72) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,392

(22) Filed: Jan. 29, 2014

Related U.S. Application Data

(63) Continuation of application No. 13/586,192, filed on Aug. 15, 2012, now Pat. No. 8,683,536, which is a continuation of application No. 11/818,018, filed on Jun. 13, 2007, now Pat. No. 8,286,214.

(51) Int. Cl.
*G06F 3/00* (2006.01)
*G06F 13/00* (2006.01)
*H04N 21/61* (2011.01)
*H04N 21/234* (2011.01)
*H04N 21/2665* (2011.01)

(52) U.S. Cl.
CPC ..... *H04N 21/6125* (2013.01); *H04N 21/23424* (2013.01); *H04N 21/2665* (2013.01)
USPC .............................. 725/39; 725/109; 725/112

(58) Field of Classification Search
USPC ............................................ 725/32, 109, 112
See application file for complete search history.

(56) References Cited

U.S. PATENT DOCUMENTS 8,286,214 B2 * 10/2012 Ho et al. ........................ 725/112
8,683,536 B1 * 3/2014 Ho et al. ....................... 725/109

* cited by examiner

*Primary Examiner* — Hunter B Lonsberry
(74) *Attorney, Agent, or Firm* — North Shore Patents, P.C.; Michele Liu Baillie

(57) ABSTRACT

Provided is a method and system for receiving and displaying video from both an Internet and a broadcast video source. Also provided is a frame controller for receiving video data from an Internet video stream and from a cable broadcast video stream, the frame controller further in communication with a television display and causing the Internet video stream and the cable broadcast video stream to each be displayed in a separate frame on the television display.

29 Claims, 5 Drawing Sheets

METHOD AND SYSTEM TO COMBINE BROADCAST TELEVISION AND INTERNET TELEVISION

CROSS-REFERENCE TO RELATED APPLICATIONS

The present application is a continuation of co-pending U.S. patent application Ser. No. 13/586,192, filed on Aug. 15, 2012, which in turn in a continuation of U.S. Pat. No. 8,286,214, issued on Oct. 9, 2012.

BACKGROUND OF THE INVENTION

1. Field of the Invention

This invention generally relates to media, and more particularly, to a method and system to combine broadcast television and Internet television.

2. Background of the Invention

It is commonplace today for cable television and satellite television networks to carry several hundred channels. Typically, even a subscriber to basic services gets over 50 channels. It is not uncommon for a subscriber to have over 100 channels available with a subscription. Advances in Internet video and television make available thousands more channels and videos for consumer entertainment.

Many Internet videos and television channels are closely related to television programs shown on regular television channels, yet consumers cannot view a television program and switch to related Internet videos easily on their television set.

For example, in one scenario, while John is watching a NCAA sweet sixteen basketball match on an ESPN cable channel, he may want to see updates of other concurrent NCAA games, which are available on ESPN's Internet website. In order to view the concurrent games, John has to take his laptop computer into the same room and connect to ESPN's website.

In another exemplary scenario, Mary is watching a HBO channel showing the movie "Titanic". She is curious about actor Leonardo DiCaprio, and wishes to investigate his current events. Particularly Mary is interested in seeing a preview of a recent Leonardo DiCaprio movie titled "The Departed". Mary does not want to go to the computer in the kitchen, but is otherwise unable to view the Internet movie preview.

Thus, there is a need to allow combined showings of Internet videos and traditional television onto a television set.

SUMMARY OF THE INVENTION

An aspect of the present invention provides a television system and method including a frame controller for receiving video data from a plurality of video streams. At least one of the video streams is from an Internet source, and at least one other of the video streams is from a broadcast source. The frame controller is further in communication with a television display and causes the video stream from the Internet source and from the broadcast source to each be displayed in a separate frame on the television display.

In one aspect of the invention, the Internet video stream relates to an image and sounds signal source from one of the Internet, a web portal, or a web site.

In another aspect of the invention, the frame controller provides an interactive television between the Internet source and a consumer session.

In one aspect of the invention, the broadcast video stream relates to an image and sounds signal source from one of a broadcast television network, a cable television network, or a satellite television network.

In another aspect of the invention, the broadcast video stream relates to an image and sounds signal source from a multi-channel operator.

In one aspect of the invention, the broadcast video stream relates to an image and sounds signal source from a multi-service operator.

In another aspect of' the invention, the frame controller selects the broadcast video stream based on the Internet video stream.

In another aspect of the invention, the frame controller selects the Internet video stream based on the broadcast video stream.

In another aspect of the invention, the frame controller selects the Internet video stream and the broadcast video stream based on a common attribute.

Another aspect of the invention includes a datastore in communication with the frame controller. The datastore includes paired broadcast and Internet video streams. The frame controller selects the broadcast video stream to display by querying the data store with the Internet video stream, then displaying the broadcast video stream paired with the Internet video stream as returned by the datastore.

In another aspect of the invention, the datastore is queried with a broadcast video stream and the frame controller selects for display the Internet video stream paired with the broadcast video stream as returned by the datastore.

In another aspect of the invention, the frame controller is in communication with a network computer and the network computer selects the Internet video stream to display.

In another aspect of the invention, a program guide is provided from an Internet source. The program guide includes information regarding broadcast video streams. It is used by the frame controller, which selects the Internet video stream to display based on information regarding the broadcast video stream obtained from the program guide.

In another aspect of the invention, the frame controller selects a second Internet video stream to display based on information regarding the broadcast video stream.

In another aspect of the invention, the frame controller 'selects a second broadcast video stream to display when the broadcast video stream ends.

Another aspect of the invention also includes a program guide provided by an Internet source, which includes information regarding Internet video streams. The frame controller selects the broadcast video' stream to display based on information regarding the Internet video stream from the program guide.

In another aspect of the invention, the frame controller selects a second Internet video stream to display based on information regarding the broadcast video stream.

In another aspect of the invention, the frame controller selects a second broadcast video stream to display when the broadcast video stream ends.

In another aspect of the invention, the video stream from the Internet source and from the broadcast source are displayed simultaneously.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The term "video data" referred to in the descriptions of various embodiments of the invention herein described is intended to generally describe electronic audio and video signals containing or incorporating video for display on a television or other video display device. This term is used in the broadest sense as known in the electronic arts, and may include analog and/or digital signals. Likewise, the term "video stream" is used in a non-limiting fashion and generally refers to the collection of video data, together with any carrier signals, data headers or other electronic information, which singularly or taken together allow the described embodiments to operate. For example, a digital video stream from a given video source might include multiple packets of compressed video data, each packet or group thereof having one or more packet headers. Typically, one or more of the headers includes information relating to the video data, such as the compression algorithm used, the aspect ratio, etc.

As used herein, the terms "picture frame" and "frame" refer to the borders of a displayed picture. Unless otherwise specified, a picture frame does not necessarily have a border of any particular width, i.e., a displayed picture might occupy the entire area of the picture frame, or the picture frame may include a border. Reference to locations on a display device may be made by referring to either the location of the picture frame or to the location of displayed picture itself, without limitation. Reference to the size of a picture frame refers to the height and width of the frame, and frames of differing width and/or differing height are referred to as being of different sizes.

As used herein, the term "picture" refers to the whole of the display image and its picture frame, unless otherwise indicated, without limitation.

Figure 1:
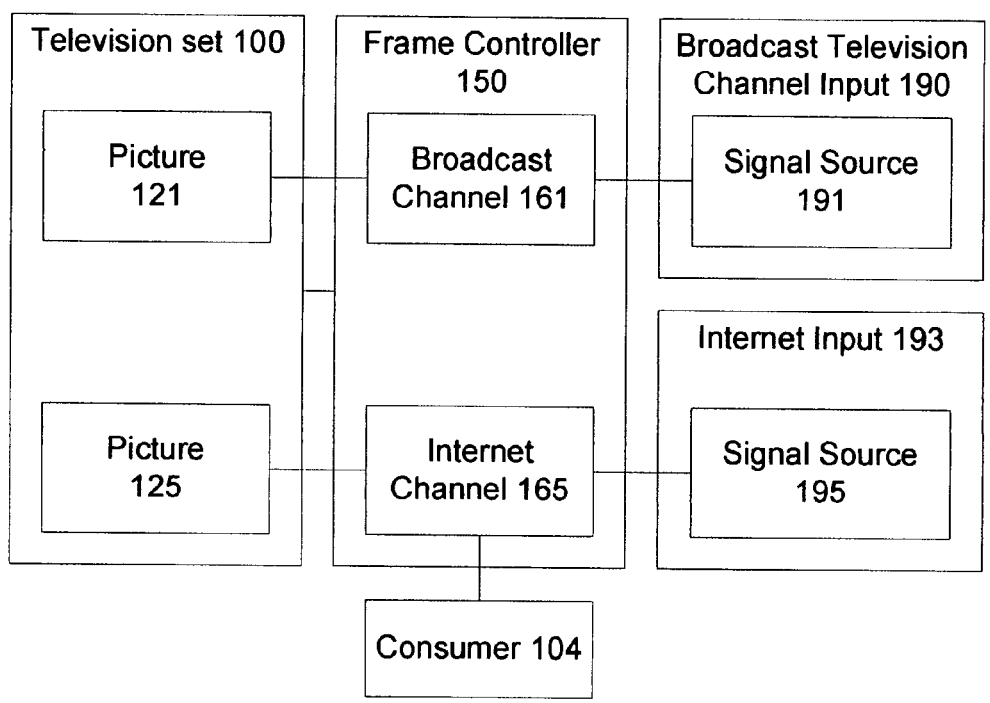
FIG. 1 is a schematic diagram illustrating a television set displaying a broadcast television channel and an Internet television channel at the same time, in accordance with an embodiment of the present invention.

FIG. 1 illustrates an exemplary television set displaying a broadcast television channel and an Internet television channel at the same time. In an embodiment of the invention, television set 100 is an electronic device that receives images and sound signals from a plurality of television channels, including a broadcast television channel 161 and an Internet television channel 165. Broadcast television channel 161 or broadcast channel 161 relates to images and sounds signal source 191, which, in one embodiment, is from a broadcast television network, a cable television network, a satellite television network, or any other multi-service or multi-channel operator. In one embodiment, Internet television channel 165 or Internet channel 165 relates to images and sounds signal source 195 from the Internet, a web portal, or a web site, and provides an interactive television session between signal source 195 and consumer 104.

In an embodiment, television set 100 includes picture 121 and picture 125. Picture 121 and picture 125 are controlled by a frame controller 150, which displays broadcast channel 161 onto picture 121, and Internet channel 165 onto picture 125. The frame controller 150 displays picture 121 and picture 125 simultaneously.

In one embodiment, the frame controller 150 is included in television set 100. In another embodiment, the frame controller 150 connects to television set 100 through an interface. The interface may be an RF interface, a HDMI interface, an S-video interface, a component interface, a composite interface, a network interface, or a wireless network interface such as Wireless Local Area Network (WLAN), Worldwide Interoperability for Microwave Access (WiMax), an Ultra-Wideband (UWB) network, or other suitable interface, without limitation.

In various embodiments of the invention, the frame controller 150 connects to a broadcast television channel input 190, such as an antenna, cable television network, satellite television network, IPTV. The broadcast television channel input 190 includes a signal source 191. The frame controller 150 also connects to an Internet input 193, which may include a home network, an Ethernet network, a WiFi network, a DSL network, an Intranet network, a hotspot network, a public data network, a cellular data network, or a private data network. Internet input 193 includes signal source 195.

An exemplary frame controller 150 relates broadcast channel 161 and Internet channel 165. In one embodiment, frame controller 150 selects broadcast channel 161 based on Internet channel 165. In another embodiment, frame controller 150 selects Internet channel 165 based on broadcast channel 161. In yet another embodiment, broadcast channel 161 and Internet channel 165 are related to a theme such as sports, news, or movie.

Figure 2:
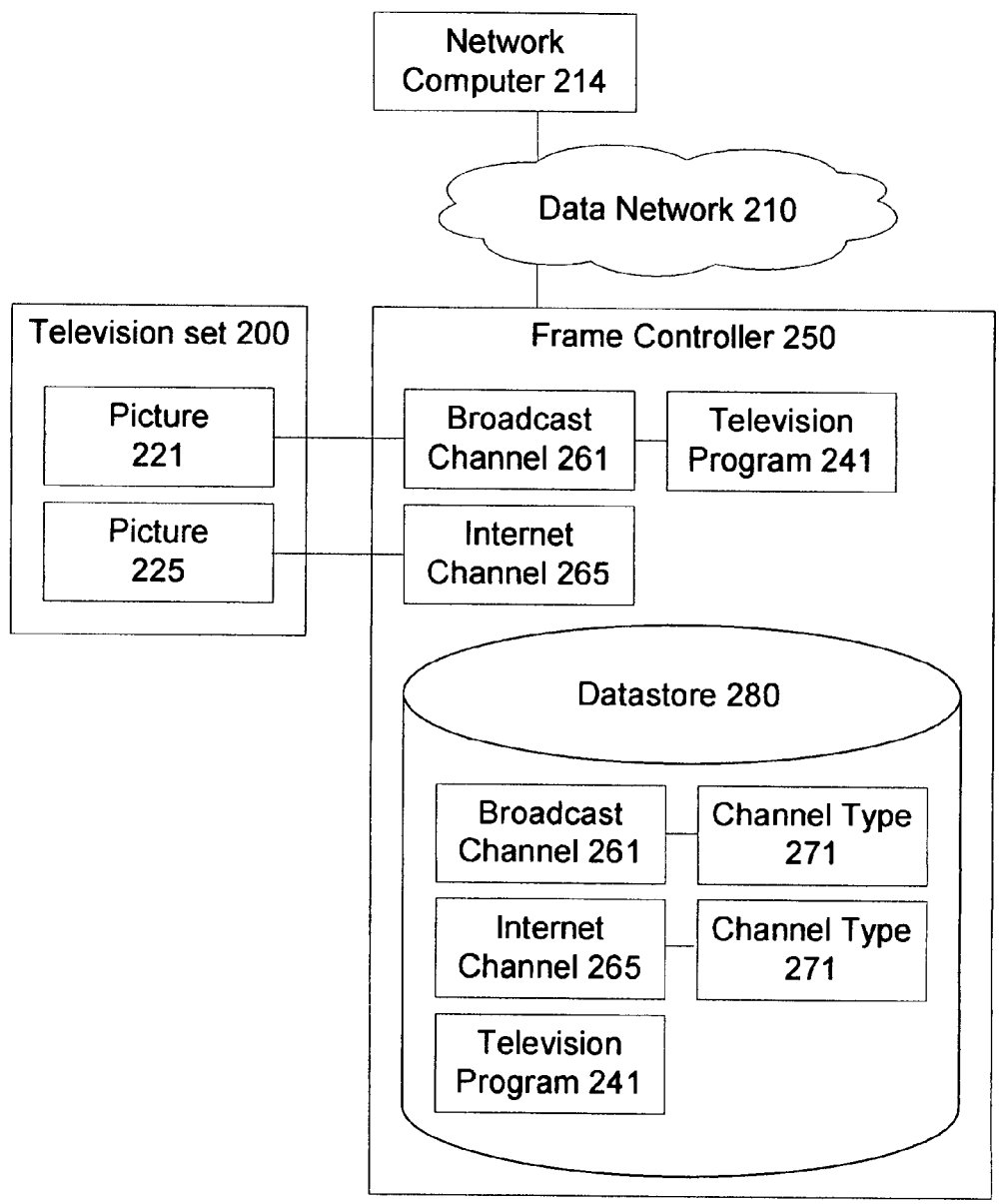
FIG. 2 is a schematic diagram illustrating a process of selecting an Internet channel based on broadcast channel, in accordance with an embodiment of the present invention.

FIG. 2 illustrates an exemplary process of selecting an Internet channel based on broadcast channel. In an embodiment, frame controller 250 displays broadcast channel 261 onto picture 221, and then selects Internet channel 265 based on broadcast channel 261, displaying Internet channel 265 onto picture 225.

In one embodiment, frame controller 250 selects Internet channel 265 based on the type of broadcast channel 261. For example, broadcast channel 261 may be a movie channel, a sports channel, a news channel, a cartoon channel, or a shopping channel, having the type "movie", "sports", "news", "child", or "shopping", respectively. The frame controller 250 includes a datastore 280, which includes pairs of broadcast channel 261 and channel type 271, wherein channel type 271 is broadcast channel 261 type. Frame controller 250 then matches broadcast channel 261 against its datastore 280 and retrieves channel type 271.

The datastore 280 further includes a pairs of channel type 271 and Internet channel 265. The frame controller 250 may then match retrieved channel type 271 against datastore 280 and retrieve Internet channel 265. The frame controller 250 may then select Internet channel 265 for display onto picture 225.

In another embodiment, the frame controller 250 connects to a network computer 214 over a data network 210, such as the Internet, a home network, or other type of data network. The frame controller 250 then sends a query with broadcast channel 261 to the network computer 214, and retrieves Internet channel 265 from network computer 214. In such an embodiment, network computer 214 may select Internet channel 265 by any criteria, such as by type relatedness.

In one example, broadcast channel 261 is a sports channel. Frame controller 250 selects Internet channel 265 to be an Internet video portal providing highlights of current sport events, or an Internet video portal providing archives of sports event videos' or televised sports programs. In another example, broadcast channel 261 is a US news channel. Frame controller 250 selects Internet channel 265 to be an Internet video portal providing news in Europe, news in Asia, news in Africa. In other examples, Internet channel 265 may provide news in entertainment, news in local community, news in traffic, or other news.

In another example, broadcast channel 261 is a movie channel, and frame controller 250 selects Internet channel 265 to be an Internet video portal providing information about movie stars, celebrities, or fashion. In other examples, Internet channel 265' may provide previews of movies currently shown in cinemas, or archives of classic movies.

In one embodiment, frame controller 250 selects Internet channel 265 based on the current television program 241 showing on broadcast channel 261. For example, if television program 241 is a movie, frame controller 250 may obtain information about television program 241, such as program type, casts, content description, and other information. In another example, television program 241 is a movie, such as "Titanic", starring "Leonardo DiCaprio" and "Kate Winslet".

In one embodiment, datastore 280 includes a television guide. Frame controller 250 obtains television program 241 information from datastore 280 by matching broadcast channel 261 and current time against datastore 280. In another embodiment, frame controller 250 queries a network computer 214 using broadcast channel 261 and current time to obtain information regarding television program 241. Frame controller 250 sends television program 241 information to network computer 214, and obtains Internet channel 265. Frame controller 250 receives signals from Internet channel 265 and displays these onto picture 225.

Figure 3:
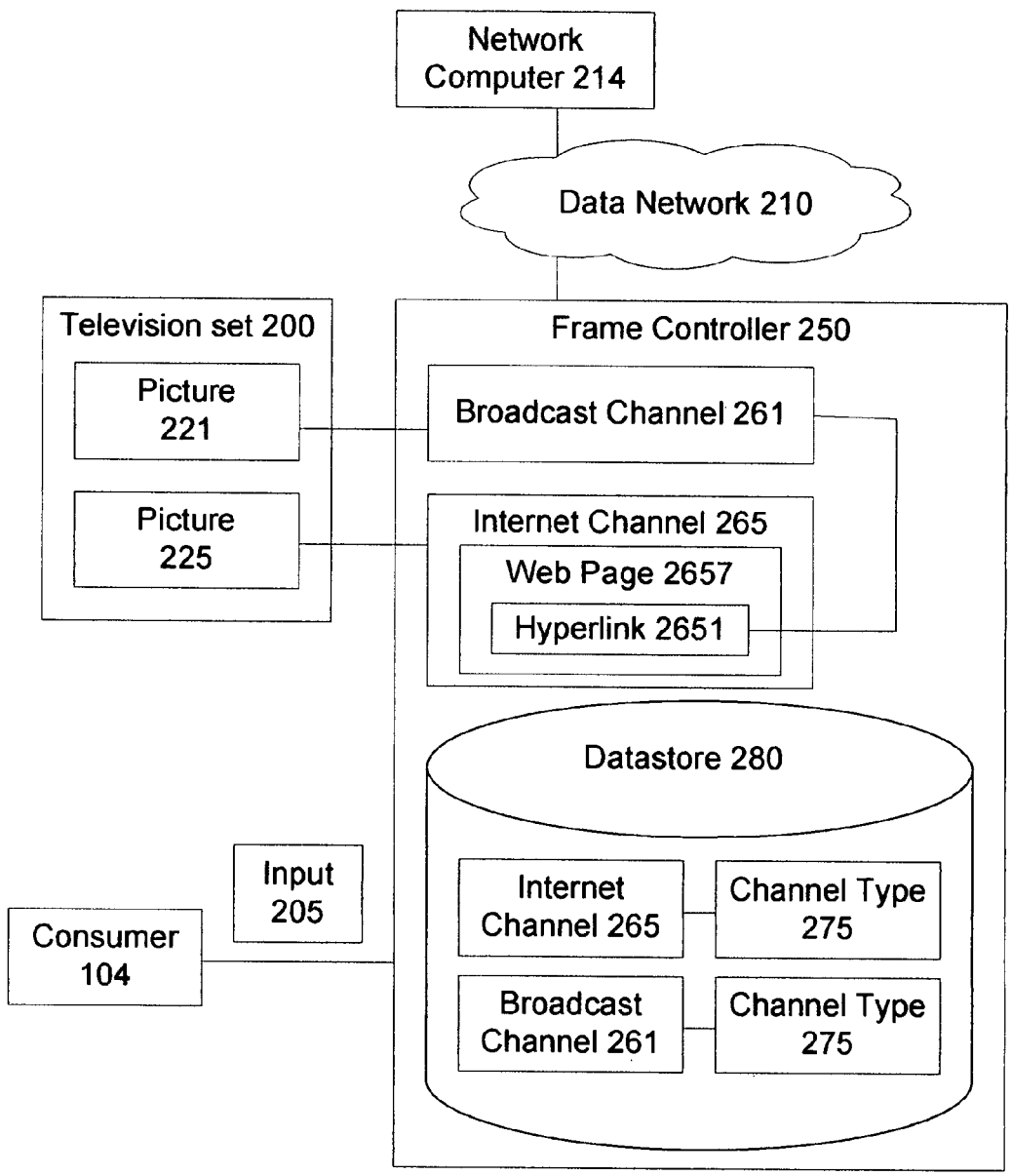
FIG. 3 is a schematic diagram illustrating a process of selecting a broadcast channel based on an channel, in accordance with an embodiment of the present invention.

FIG. 3 illustrates a process of selecting a broadcast channel based on an Internet channel. Frame controller 250 displays Internet channel 265 onto picture 225. Frame controller 250 selects broadcast channel 261 based on Internet channel 265, and displays broadcast channel 261 onto picture 221.

In one embodiment, frame controller 250 selects broadcast channel 261 based on the type of Internet channel 265. For example, Internet channel 265 may be a movie channel providing movie videos, a sports channel providing information and videos about sports, a news channel, a children friendly video portal, or an online e-commerce shopping portal. In these instances, Internet channel 265 has type "movie", "sports", "news", "kids", or "shopping", respectively. In another embodiment, datastore 280 includes a pair of Internet channels 265 and channel type 275, wherein channel type 275 is Internet channel 265 type. Frame controller 250 matches Internet channel 265 against datastore 280 and retrieves channel type 275. Datastore 280 further includes a pair of channel type 275 and broadcast channel 261. Frame controller 250 matches retrieved channel type 275 against datastore 280 and retrieves broadcast channel 261. Frame controller 250 receives signals from broadcast channel 261 and displays the signals onto picture 221.

In one embodiment, frame controller 250 sends a query with Internet channel 265 to network computer 214, and retrieves broadcast channel 261 from network computer 214.

In another embodiment, Internet channel 265 includes a hyperlink 2651, which references broadcast channel 261. In one example, hyperlink 2651 includes a URL such as "tv://espn", "tv://Cable/channel-38", "tv://ATTIPTV/SanFrancisco/channel-7", or "tv://Verizon-tv/premiumservices/HBO". Frame controller 250 processes hyperlink 2651 and selects broadcast channel 261 based on hyperlink 2651. In one embodiment, Internet channel 265 includes an interactive web page 2657. Consumer 104 provides input 205 to frame controller 250, which processes the input 205 and obtains hyperlink 2651. In one embodiment, web page 2657 includes hyperlink 2651. Frame controller 250 processes input 205 to retrieve hyperlink 2651. In another embodiment, frame controller 250 processes input 205, sends a message to network computer 214, and retrieves hyperlink 2651, which is processed to select broadcast channel 261.

In another embodiment, frame controller 250 processes URL "tv://espn", and retrieves "espn". Broadcast channel 261 is associated with name "espn", and is selected by frame controller 250. Alternatively, datastore 280 may associate "espn" with broadcast channel 261. In another embodiment, frame controller 250 processes URL "tv://Cable/channel-38", and retrieves "Cable" and "channel-38". Frame controller 250 determines broadcast television channel input 190 includes cable television network, matching "Cable". Frame controller 250 then selects broadcast channel 261 as channel 38 from the broadcast television channel input 190.

Figure 4:
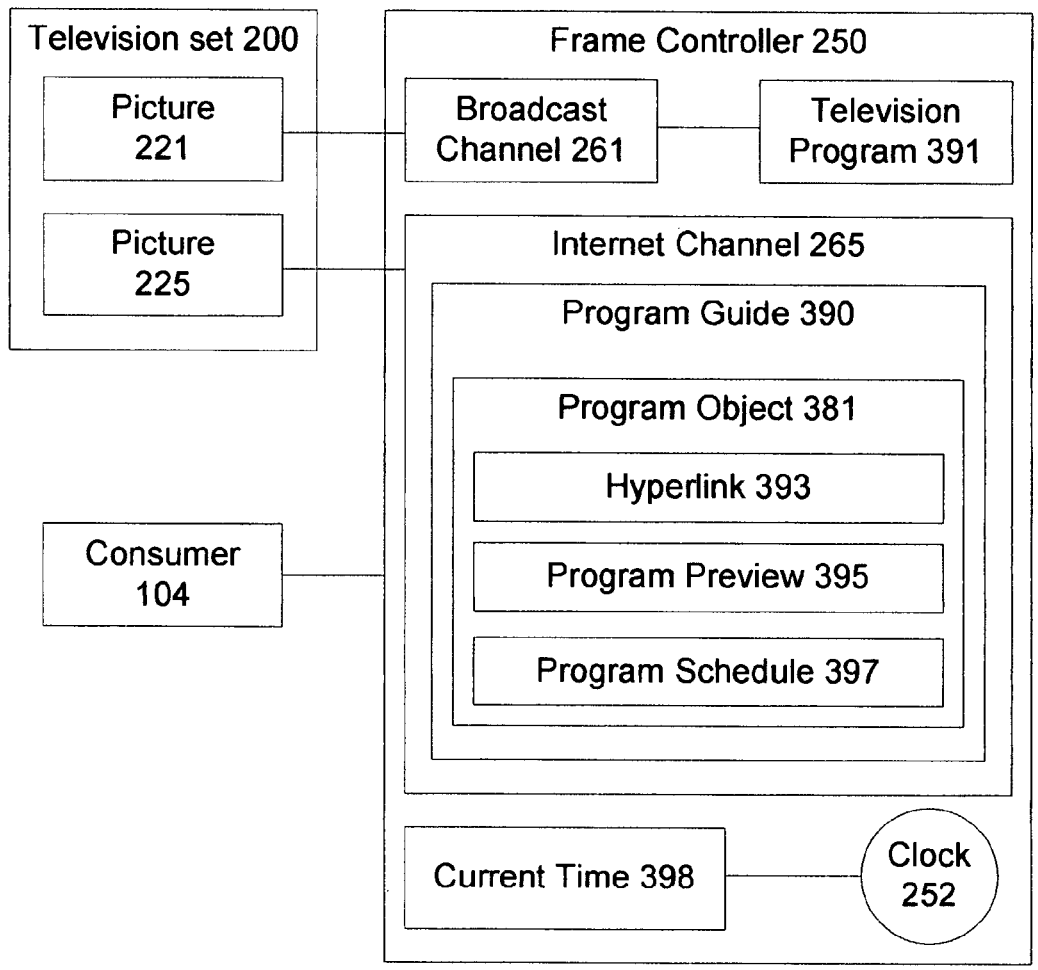
FIG. 4 is a schematic diagram illustrating an Internet channel providing a television programming guide, in accordance with an embodiment of the present invention.

FIG. 4 illustrates an exemplary Internet channel providing a television programming guide. In an embodiment, Internet channel 265 provides program guide 390. For example, program guide 390 is a web page including a program object 381, which includes hyperlink 393 referenced to broadcast channel 261, and program preview 395. In one embodiment, program preview 395 is a video clip, and frame controller 250 displays program preview 395 onto picture 225. The consumer 104 selects program object 381, and frame controller 250 processes the selected hyperlink 393 of program object 381, selects broadcast channel 261, and displays broadcast channel 261 onto picture 221.

In another embodiment, program object 381 is associated with television program 391 showing on broadcast channel 261. Television program 391 may include a television show, a movie, a televised sports program, a news program, an episode, a documentary program, a televised concert show, or a televised event. Television program 391 may also include an advertisement, a public announcement, or an alert.

In one embodiment, program object 381 includes a program schedule 397. Frame controller 250 checks the current time 398 against program schedule 397. For example, frame controller 250 may include a clock 252 form which current time 398 is obtained. In another embodiment, frame controller 250 obtains current time 398 from a broadcast television channel input 190 or from an Internet input 193. If the program schedule 397 matches the current time 398, frame controller 250 processes hyperlink 2651. For example, in one embodiment, program schedule 397 includes a beginning time such as 7:00 pm, and duration such as 30 minutes. In another embodiment, program schedule 397 includes a start time such as 11:30 am and an end time such as 1:30 pm. In such an embodiment, the current time 398 matches program schedule 397 when the current time 398 is within the duration of the beginning time, or between the start and end times.

Figure 5:
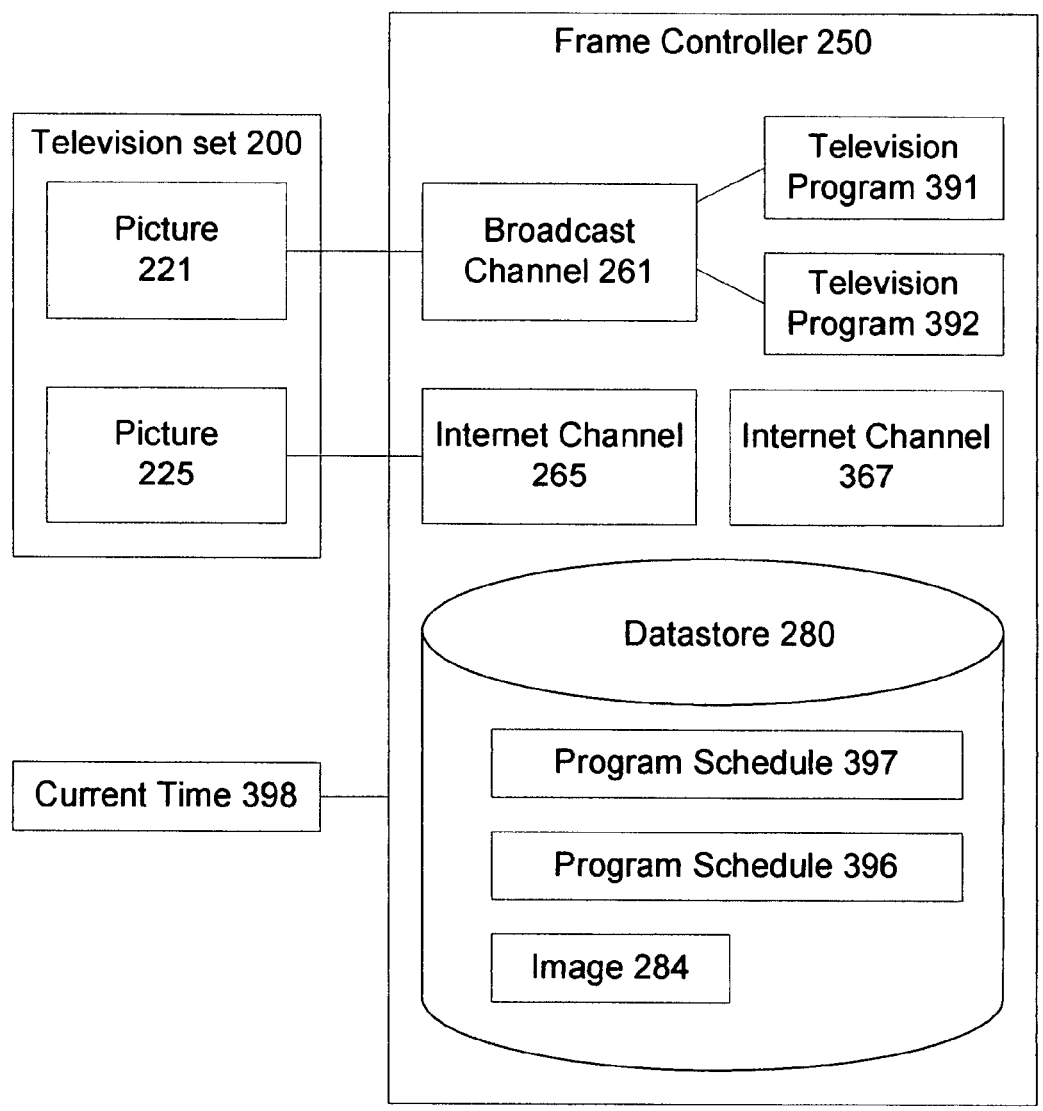
FIG. 5 is a for selecting schematic diagram illustrating a process for selecting a second Internet channel, in accordance with an embodiment of the present invention.

FIG. 5 illustrates an exemplary process for selecting a second Internet channel. Frame controller 250 displays broadcast channel 261 and Internet channel 265. Broadcast channel 261 is playing a television program 391. Frame controller 250 selects a second Internet channel 367 based on television program 391. In an embodiment, frame controller 250 includes datastore 280, which further includes program schedule 397 of television program 391 on broadcast channel 261. Frame controller 250 obtains current time 398 and matches it against the program schedule 397 and determines the current time 398 is not within program schedule 397. Frame controller 250 determines that television program 391 ends and selects second Internet channel 367, for example, an Internet television programming guide channel, as illustrated in FIG. 4. In one embodiment, frame controller 250 displays Internet channel 367 onto picture 225.

In one embodiment, broadcast channel 261 includes a second television program 392. Frame controller 250 detects that broadcast channel 261 changes from television program 391 to television program 392. In an embodiment, datastore 280 includes program schedule 396 of program 392. Frame controller 250 determines current time 398 matches program schedule 396, and selects Internet channel 367.

In another embodiment, frame controller 250 selects a second Internet channel 367 based on images of television program 391. In an embodiment, data store 280 includes image 284. Frame controller 250 matches image 284 against images of television program 391. If there is a match, frame controller 250 selects second Internet channel 367.

In one embodiment, selection of second Internet channel 367 is based on images of television program 392. In another embodiment, image 284 includes control information of television program 391.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An Internet television controller, comprising:
a video controller configured to receive data regarding a plurality of video streams and to provide means to select a video for display, the plurality of video streams comprising an online video channel and a second video channel, the video controller further in communication with a display over a wireless network,
wherein the video controller is further configured to select the online video channel according to a channel type of the second video channel,
wherein the video controller is further configured to cause a first video of the online video channel and a second video of the second video channel to each be displayed in separate frames on the display.

2. The controller of claim 1, wherein the video controller is configured to receive the data regarding the plurality of video streams over a cellular data network.

3. The controller of claim 1, wherein the online video channel is selected based on the second video.

4. The controller of claim 3, wherein the online video channel is selected based on a currently received video data of the second video.

5. The controller of claim 4, wherein the first video of the online video channel is an advertisement.

6. The controller of claim 1, wherein the second video channel comprises the second video retrieved from a network computer connected to the video controller over a local area network.

7. The controller of claim 1, wherein the second video channel comprises a broadcast channel or a second online video channel.

8. The controller of claim 7, wherein the broadcast channel comprises a cable channel, a satellite TV channel, or an off-the-air channel.

9. The controller of claim 1, wherein the channel type comprises a theme.

10. The controller of claim 9, wherein the theme comprises at least one of the following: movies, sports, news, kids, cartoon, or shopping.

11. The controller of claim 1, wherein the video controller is further configured to send a query for the online video channel to a network computer, wherein the query comprises the channel type of the second video channel.

12. A television system, comprising:
a video controller configured to receive data regarding a plurality of video streams and to provide means to select a video for display, the plurality of video streams comprising an online video channel and a second video channel; and
a display in communication with the video controller over a wireless network,
wherein the video controller is further configured to select the online video channel according to a channel type of the second video channel,
wherein the video controller is further configured to cause a first video of the online video channel and a second video of the second video channel to each be displayed in separate frames on the display.

13. The system of claim 12, wherein the online video channel is selected based on a currently received video data of the second video.

14. The system of claim 13, wherein the first video of the online video channel is an advertisement.

15. The system of claim 12, wherein the second video channel comprises the second video retrieved from a network computer connected to the video controller over a local area network.

16. The system of claim 12, wherein the channel type comprises a theme.

17. The system of claim 16, wherein the theme comprises at least one of the following: movies, sports, news, kids, cartoon, or shopping.

18. A method for displaying an Internet video, comprising:
receiving, by a video controller, data regarding a plurality of video streams, the plurality of video streams comprising an online video channel and a second video channel;
selecting, by the video controller, the online video channel according to a channel type of the second video channel;
causing, by the video controller in communication with a display over a wireless network, a first video of the online video channel and a second video of the second video channel to each be displayed in separate frames on the display.

19. The method of claim 18, wherein the receiving comprises:
receiving, by the video controller, the data regarding the plurality of video streams over a cellular data network.

20. The method of claim 18, wherein the selecting further comprises:

selecting, by the video controller, the online video channel based on a currently received video data of the second video.

21. The method of claim 20, wherein the first video of the online video channel is an advertisement.

22. The method of claim 18, wherein the second video channel comprises the second video retrieved from a network computer connected to the video controller over a local area network.

23. The method of claim 18, wherein the second video channel comprises a broadcast channel or a second online video channel.

24. The method of claim 18, wherein the channel type comprises a theme.

25. The method of claim 24, wherein the theme comprises at least one of the following: movies, sports, news, kids, cartoon, or shopping.

26. The method of claim 18, wherein the selecting comprises:
sending, by the video controller, a query for the online video channel to a network computer, wherein the query comprises the channel type of the second video channel.

27. A method for displaying an Internet video, comprising:
receiving, by a video controller, data regarding an Internet video channel and a second video channel;
selecting the Internet video channel based on a channel type associated with the second video channel;
causing, by the video controller in communication with a display over a wireless data network, the display to display the Internet video channel and the second video channel in separate frames on the display.

28. The method of claim 27, wherein the Internet video channel comprises a first video, wherein the selecting comprises:
selecting the first video based on a second video of the second video channel; and
causing, by the video controller, the display to display the first video and the second video in the separate frames.

29. The method of claim 28, wherein the selecting of the first video comprises:
selecting the first video based on a current video data of the second video.

* * * * *